Patented Mar. 2, 1943

2,312,462

UNITED STATES PATENT OFFICE 2,312,462

DYESTUFFS OF THE ANTHRAQUINONE SERIES

Alexander J. Wuertz and Donald P. Graham, Wilmington, Del., assignors to E. I. du Pont de Nemours & Company, Wilmington, Del., a corporation of Delaware No Drawing. Application February 24, 1941, Serial No. 380,302

2 Claims. (Cl. 260—274)

This invention relates to the preparation of new dyestuffs of the anthraquinone series and more particularly to the preparation of gray vat dyestuffs of the benzanthrane acriding series.

In U. S. P. 995,936 the preparation of a green dyestuff by the alkaline ring closure of Bz-1-benzanthronyl-1-aminoanthraquinone or which may be referred to as Bz-1-1'-anthraquinonyl-aminobenzanthrone is described. This compound, prior to the alkaline ring closure, has the formula:

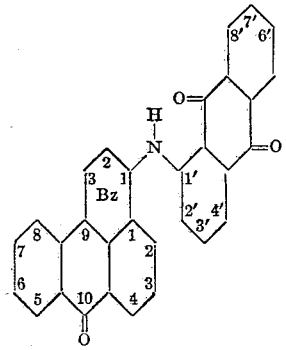

The nomenclature employed in the present application will be based on the numbering employed in this formula. This class of dyestuffs of which the product of 995,936 is the simplest member has been found to exhibit excellent fastness properties and various modifications of this molecule by the substitution more particularly of simple monovalent substituents on the anthraquinone or benzanthrone nucleus of the green molecule have produced dyes varying in shade from green through olive to gray. Very little has been determined in regard to the further condensation of the simple molecule of U. S. 995,936 with compounds which on ring closure produce higher ring systems particularly where heterocyclic rings are directly attached to the benzanthrone nucleus.

It is an object of this invention to prepare dyestuffs of the benzanthrone acridine series which dye cotton in olive to gray shades and which exhibit excellent fastness properties.

We have found that where 6-Bz-1-dibromobenzanthrone is first condensed with 1 molecule of alpha-aminoanthraquinone or a simple monovalent substituted alpha-aminoanthraquinone, and then with 1 molecule of a 1-aminoanthraquinone-2-phenyl-azo-methine the reaction takes place in which a further condensed ring system is produced even prior to the alkaline condensation which is required to ring close the anthraquinonylamino group on the benzanthrone nucleus to an acridine ring. By varying the simple monovalent substituents in the alpha-aminoanthraquinone employed, a wide range of dyestuffs may be produced which exhibit excellent fastness properties and which dye cotton from the usual alkaline hydrosulfite vat in olive to gray shades.

The following examples are given to illustrate the invention. The parts used are by weight.

Example 1

14.50 parts of 6-Bz-1-dibromobenzanthrone of the formula:

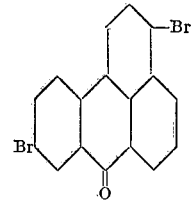

8.34 parts of 1-amino-anthraquinone, 20 parts of soda ash, 2 parts of copper acetate, and 0.2 part of copper powder are slurried in 150 parts of nitrobenzene and the charge is heated to 200–210° C. for 2 hours. It is then cooled to 180° C. and 12.2 parts of 1-aminoanthraquinone-2-phenyl-azo-methine of the formula:

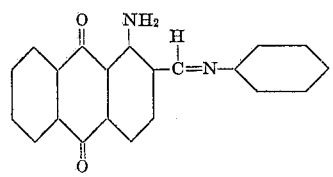

5 parts of soda ash, 0.5 part of copper acetate, and 0.05 part of copper powder are added. It is again heated to 200–210° C. and held at this temperature for 10–15 hours, then cooled to 80° C. and filtered. The filter cake is washed with nitrobenzene followed by alcohol, extracted with dilute hydrochloric acid, washed acid free and dried.

Ten parts of potassium hydroxide are added to ten parts of ethyl alcohol and warmed slowly to 120° (allowing some alcohol to distill off). The mass is then cooled to 110° C. and 1 part of the Bz - 1 - anthraquinonylaminobenzanthrone prepared as described above and ground to pass an 80 mesh screen is added. The charge is heated during 1 hour to 160° C., under reflux, (allowing some alcohol to distill off during the heating period). It is then stirred at 155–160° C. for ½ hour to one hour and drowned in 200 parts of water. The slurry is heated to the boil and stirred at 90–100° C. until oxidation (by aeration) is complete and the crude color has been completely precipitated.

The slurry is filtered at this point and the filter cake is washed alkali free and dried.

Ten parts of the crude color are dissolved in 200 parts of 96% sulfuric acid at 3 to 5° C. and drowned in cold water. The slurry is filtered and the filter cake is washed acid free. The product is isolated as a dark colored paste. It dissolves in sulfuric acid with a blue green color (olive to brown in weak oleum) and dyes cotton in fast gray olive shades from a dark colored vat.

Example 2

14.5 parts of 6-Bz-1-dibromobenzanthrone, 9.0 parts of 1-amino-4-hydroxyanthraquinone, 20 parts of soda ash, 2 parts of copper acetate, and 0.2 part of copper powder are slurried in 150 parts of nitrobenzene and the charge is heated to 200–210° C. for 2 hours. It is then cooled to 180° C. and at 180–190° C., 12.2 parts of 1-amino-anthraquinone-2-phenyl-azo-methine, 5 parts of soda ash, 0.5 part of copper acetate, and 0.05 part of copper powder are added. The charge is again heated to 200°, held at 200 to 210° C. for 10 to 15 hours, cooled to 80° C. and filtered. The filter cake is washed with nitro-benzene followed by alcohol, extracted with dilute hydrochloric acid, washed acid free, and dried. The dry intermediate is fused with alcoholic KOH and the product pasted from sulphuric acid as described in Example 1.

The finished dyestuff (isolated as a dark colored paste) dissolves in sulfuric acid with a brown color and dyes cotton in fast olive shades from a dark brown vat. This product shows particularly good fasteness to light and washing.

Example 3

14.5 parts of 6-Bz-1-dibromobenzanthrone, 13.7 parts of 1-amino-5-benzoylamino-anthraquinone, 20 parts of soda ash, 2 parts copper acetate and 0.2 part of copper powder are slurried in 200 parts of nitrobenzene, heated to 200–210° C. for 2 hours and cooled to 180° C. At this temperature, 12.2 parts of 1-amino-anthraquinone-2-phenyl-azo-methine, 5 parts of soda ash, 0.5 part of copper acetate, and 0.05 part of copper powder are added. The charge is again heated to 200–210° C., held at this temperature for 10 to 15 hours, cooled to 80° C. and filtered. The filter cake is washed free of mother liquor with nitrobenzene, followed by alcohol, extracted with dilute hydrochloric acid, washed acid free and dried. The resulting intermediate is fused with alcoholic KOH and the crude product pasted from sulfuric acid as described in Example 1. The finished dyestuff is isolated as a dark colored paste. It dissolves in concentrated sulfuric acid with a blue-green color, and dyes cotton in fast olive shades from a dark bordeaux-brown vat.

Example 4

Thirteen parts 6-Bz-1-dibromobenzanthrone, 11.4 parts of 5-aminoanthraquinone-2:1-benzacridone, 10 parts of soda ash, 1 part of copper acetate, and 0.1 part of copper powder are slurried in 150 parts of nitrobenzene. The charge is heated to 200–210° for 5 hours, cooled to 180° C. and at this temperature, 11 parts of 1-amino-anthraquinone-2-phenyl-azo-methine are added. The mass is then heated to 200–210° C. for ten hours, cooled to 100° C. and filtered. The filter cake is washed with nitrobenzene followed by alcohol, extracted with dilute hydrochloric acid, washed acid free and dried. The dried intermediate is fused with alcoholic potassium hydroxide and acid pasted as described in Example 1. The product is isolated as a dark colored paste. It dissolves in sulfuric acid with a brown color and dyes cotton in deep red brown shades from a reddish-blue vat. Isomeric derivatives of this dyestuff may be prepared by using 4-aminoanthraquinone-2:1-benzacridone or 8-aminoanthraquinone-2:1-benzacridone as described above.

Example 5

Twelve parts of 1:5-diaminoanthraquinone, 40 parts of 6-Bz-1-dibromobenzanthrone, 25 parts of soda ash, 2.5 parts of copper acetate, and 0.25 part of copper powder are slurried in 500 parts of nitrobenzene, heated to 200–210° C. for three hours, cooled to 180° and 35 parts 1-aminoanthraquinone-2-phenyl-azomethine are added followed by 100 parts of nitrobenzene, 15 parts of soda ash, 2 parts of copper acetate and 0.2 part of copper powder. The mass is heated to 200–210° C. for 10 to 15 hours, cooled to 80° C., filtered, washed with nitrobenzene followed by alcohol, extracted with dilute hydrochloric acid, washed acid free and dried. This intermediate is fused in alcoholic potassium hydroxide and the product acid pasted as described in Example 1. The finished dyestuff is isolated as a dark olive paste which dissolves in sulfuric acid with a green solution and dyes cotton in reddish olive shades from a dark colored vat. The resulting dyeings are especially fast to light and power laundry.

On the condensation of the 6-bromo-Bz-1-1'-anthraquinonylaminobenzanthrone with the 1-aminoanthraquinone-2-phenyl-azo-methine the product shows none of the properties of the simple unringclosed condensation products indicating that a ring closure takes place even prior to the alkaline fusion. After fusion of the resulting intermediate, and oxidation by aeration until the crude color is completely precipitated from solution, filtering, washing and drying, the product is preferably acid pasted in the usual manner as illustrated in the above examples to give the product improved solubility in the vat over the product which is not acid pasted. In the condensation of the 1-aminoanthraquinone-2-phenyl-azo-methine, it is believed that the phenyl-amino group splits out, giving what may be an acridone or a mixture of acridones and acridines. The actual molecular configuration of this compound however has not been established and this invention is not to be limited by any theoretical formulae that might be drawn to explain the possible condensation.

We claim:

1. The olive to gray dyestuffs obtained by the condensation of a 6-bromo-Bz-1-1'-anthraquinonylamino-benzanthrone with 1 mole of a 1-amino-anthraquinone-2-phenyl-azo-methine and subjecting the resulting condensation product to a caustic alkaline condensation reaction.

2. The product obtained by the condensation of 1 mole of an alpha-amino-anthraquinone with 6-Bz-1-dibromobenzanthrone, further condensing the resulting product with 1 mole of 1-aminoanthraquinone-2-phenyl-azo-methine and subjecting the resulting condensation product to a caustic alkaline fusion, which product after acid pasting dyes cotton from an alkaline hydrosulfite vat in olive to gray shades of excellent fastness properties.

ALEXANDER J. WUERTZ.
DONALD P. GRAHAM.